United States Patent [19]
Umida

[11] Patent Number: 5,506,930
[45] Date of Patent: Apr. 9, 1996

[54] CONTROL APPARATUS FOR A VARIABLE SPEED MOTOR

[75] Inventor: Hidetoshi Umida, Kawasaki, Japan

[73] Assignee: Fuji Electric Co., Ltd., Kawasaki, Japan

[21] Appl. No.: 288,953

[22] Filed: Aug. 11, 1994

[30] Foreign Application Priority Data

Aug. 11, 1993 [JP] Japan .................................... 5-198689

[51] Int. Cl.$^6$ ........................................................ G05F 1/10
[52] U.S. Cl. .......................... 388/815; 318/800; 318/806; 318/439; 318/772
[58] Field of Search ........................... 388/815; 318/800, 318/806, 772, 805, 561, 439

[56] References Cited

U.S. PATENT DOCUMENTS

| 4,986,150 | 1/1991 | Okazaki .................... 318/561 |
| 5,057,759 | 10/1991 | Ueda et al. ................ 318/800 |
| 5,296,793 | 3/1994 | Lang ........................ 318/800 |
| 5,296,794 | 3/1994 | Lang et al. ................ 318/809 |
| 5,384,527 | 1/1995 | Rozman et al. ............ 318/439 |

FOREIGN PATENT DOCUMENTS

| 0281798 | 9/1988 | European Pat. Off. . |
| 0407590 | 1/1991 | European Pat. Off. . |
| 2802224 | 7/1979 | Germany . |
| 3036658 | 4/1982 | Germany . |
| 3722099 | 1/1988 | Germany . |
| 4026091 | 2/1992 | Germany . |

OTHER PUBLICATIONS

"Speed Control of Direct–Current Drives–Using a State and Disturbance Observer" by Von G. Weihrich in *Regelungstechnik*, H.11, Jan. 1978, S.349–354; S.350.

Primary Examiner—William M. Shoop, Jr.
Assistant Examiner—Karen Maish
Attorney, Agent, or Firm—Brumbaugh, Graves, Donohue & Raymond

[57] ABSTRACT

The present invention provides a control apparatus that stably controls a mechanical system incorporating a variable speed motor by suppressing mechanical vibrations without requiring the use of a motor speed detector. In accordance with the present invention, a power converter driving the motor is controlled based on a result fed from a weighting adder that calculates a weighted sum of the mechanical system's state variables, which are estimated by a first state observer to which detected current and voltage values are fed, and a target current value or a target voltage value. Alternatively, the power converter is controlled based on a result fed from a weighting adder that calculates a weighted sum of the state variables, which are estimated by a second state observer to which detected current value and a target voltage value are fed, and a target current value or a target voltage value. As an additional alternative, mechanical vibrations are suppressed by providing a control apparatus having a combination of a current regulator and a filter, thereby providing the control apparatus with high-frequency characteristics which show a small phase delay and a low gain while preventing response deterioration and control error by increasing feedback gain in a low frequency region.

16 Claims, 14 Drawing Sheets

CONTROL APPARATUS FOR A VARIABLE SPEED MOTOR

BACKGROUND OF THE INVENTION

The present invention relates to a control apparatus for controlling a variable speed motor, and more specifically to a control apparatus for controlling a variable speed motor that suppresses mechanical vibration in a system consisting of a load coupled to the variable speed motor being driven at variable speeds.

As seen in FIG. 33, a block diagram shows a circuit configuration of a prior art control apparatus for controlling a variable speed motor. In FIG. 33, a load 4 is coupled to a motor 2 through an elastic joint 3, a power converter 5 supplies electric power to the motor 2, and a controller 9 controls the power converter 5. The motor 2 drives the load 4 at a rotation speed that coincides with a target speed value set by a speed setting device 8 in response to a control signal that the controller 9 generates. The controller 9 consists of a speed regulator 12, a current regulator 14, a fifth weighting adder 103, and a third state observer 104.

Since the load 4 is coupled to the motor 2 through the elastic joint 3, a relationship among motor speed $\omega_M$, load speed $\omega_L$ and axial torque $\tau_S$ is expressed by following equations 1, 2 and 3, in which $J_M$ is moment of inertia of the motor 2, $J_L$ is moment of inertia of the load 4, $K_S$ is a spring constant of the elastic joint 3, $\tau_L$ is load torque, $\tau_A$ is drive torque and s is a Laplace operator.

$$\omega_M = \frac{1}{s \cdot J_M} (\tau_A - \tau_S) \quad (1)$$

$$\tau_S = \frac{K_s}{s} (\omega_M - \omega_L) \quad (2)$$

$$\omega_L = \frac{1}{s \cdot J_L} (\tau_S - \tau_L) \quad (3)$$

When the load torque $\tau_L$ is zero, the motor speed $\omega_M$ is expressed by a following equation 4.

$$\omega_M = \frac{s^2 + (K_S/J_L)}{s[J_m \cdot s^2 + K_S(1 + J_M/J_L)]} \cdot \tau_A \quad (4)$$

One can ascertain from the polynomial denominator of equation 4 that the mechanical system has a resonance point. In equation 4, a controllable variable is the drive torque $\tau_A$ which is expressed by a following equation 5, in which $K_T$ is a coefficient and $I_T$ is an armature current value (torque component).

$$\tau_A = K_T I_T \quad (5)$$

Still referring to FIG. 33, a current detector 6 and a speed detector 7 detect an armature current value of the motor 2 and the speed of the motor 2, respectively. The third state observer 104, to which the detected armature current value, which generates the drive torque, and speed of the motor 2 are sent, estimates state variables such as the load speed $\omega_L$, load torque $\tau_L$, and axial torque $\tau_S$ which can not be detected directly. In addition, the motor speed detected by the speed detector 7 and a target speed set by a speed setting device 8 are supplied to the speed regulator 12. The speed regulator 12 executes control operations based on the supplied detected motor speed and target speed, and the speed regulator outputs a target current value calculated to reduce deviation of the detected motor speed from the target speed to zero.

The fifth weighting adder 103 calculates a weighted sum of the state variables supplied from the third state observer 104 and the target speed supplied from the speed regulator 12, and outputs the resultant weighted sum as a new target current value to the current regulator 14 to control the drive torque.

Turning to the current detector 6, it detects the armature current that flows through the armature of the motor 2. The detected armature current value and the target current value described above are fed to the current regulator 14. The current regulator 14 transmits to a power converter 5 a target voltage value calculated to reduce deviation between the detected armature current value and the target current value to zero. The power converter 5 in turn drives the motor 2 in response to the target voltage value set by the current regulator 14.

In FIG. 33, the third state observer 104 estimates the aforementioned state variables on the basis of the detected current value and detected motor speed, and outputs the estimated state variables to the current regulator 14 to control the drive torque and to suppress mechanical vibrations. However, because the speed detector 7 cuts off high frequency signals, mechanical vibrations of frequencies higher than the cut-off frequency of the speed detector 7 can not be suppressed by utilizing the third state observer 104. Therefore, the variable speed motor controller of FIG. 33 cannot stably control the motor 2 when vibration frequency exceeds the cut-off frequency of the speed detector 7.

In view of the foregoing, it is an object of the present invention to provide a control apparatus for controlling mechanical vibrations of high frequencies in variable speed motors.

It is another object of the present invention to provide a control apparatus for suppressing mechanical vibrations in variable speed motors, which control apparatus does not require the use of a motor-speed detector and controls the variable speed motor stably.

It is yet another object of the present invention to provide a control apparatus for suppressing mechanical vibrations in variable speed motors, which control apparatus utilizes motor-speed value detected by a motor-speed detector only for vibration frequencies which are lower than the cut-off frequency of the motor speed detector, and which control apparatus controls the variable speed motor stably.

SUMMARY OF THE INVENTION

The object of the present invention is achieved by providing an improved control apparatus for controlling a variable speed motor to which a load is coupled through an elastic joint. The control apparatus has a speed detector for detecting the speed of the motor; a current detector for detecting an armature current of the motor; a speed regulator for synchronizing the detected speed of the motor to a target speed set from outside and for outputting a target current value; a current regulator for matching the armature current detected by the current detector to the target current value set by the speed regulator and for outputting a target voltage value; and a power converter for supplying appropriate electric power to the motor based on the target voltage value set by the current regulator. The control apparatus also incorporates a first state observer for estimating state variables including the speed of the motor, speed of the load and axial torque. The first state observer estimates and puts out these state variables based on the detected armature current and detected armature voltage. Finally, the control apparatus incorporates a first weighting adder for weighting and adding the state variables set by the first state observer and the target current value set by the speed regulator. The adder transmits the resultant sum to the current regulator.

The object of the present invention is also achieved by providing a control apparatus that incorporates a first state observer and a second weighting adder. In this embodiment, the first state observer estimates and puts out, based on the detected armature current and detected armature voltage, state variables including the speed of the motor, speed of the load and axial torque. The second weighting adder weights and adds the state variables set by the first state observer and the target voltage value, and the adder transmits the resultant sum to the power converter.

The object of the present invention is also achieved by providing a control apparatus that incorporates a second state observer and a third weighting adder. The second state observer estimates and puts out, based on the detected armature current and the target voltage value set from the current regulator, state variables including the speed of the motor, speed of the load and axial torque. The third weighting adder weights and adds the state variables set by the second state observer and the target current value, and the adder transmits the resultant sum to the current regulator.

The object of the present invention is also achieved by providing a control apparatus that incorporates a second state observer and a fourth weighting adder. The second state observer estimates and puts out, based on the detected armature current and the target voltage value set by the current regulator, state variables including the speed of the motor, speed of the load and axial torque. The fourth weighting adder weights and adds the state variables set by the second state observer and the target voltage value, and the adder transmits the resultant sum to the power converter.

The object of the present invention is achieved also by providing a control apparatus for controlling a variable speed motor to which a load is coupled through an elastic joint, which control apparatus has a speed detector for detecting the speed of the motor; a current detector for detecting an armature current of the motor; a speed regulator for synchronizing the detected speed of the motor to target speed set from outside and for generating a target current value; a current regulator for equalizing the detected armature current with the target current value set by the speed regulator and for generating a target voltage value, with at least one filter connected to the current regulator; and a power converter for supplying appropriate electric power to the motor based on the target voltage value set by the current regulator. The control apparatus preferably also incorporates a first amplifier and an adder. The first amplifier calculates counter-electromotive force of the motor, i.e., the amplifier amplifies the detected speed of the motor to produce a value for counter-electromotive force based on the detected speed of the motor. The adder adds the target voltage value set by the current regulator to the calculated counter-electromotive force and transmits the resultant sum to the power converter.

The object of the present invention is also achieved by providing a control apparatus for controlling a variable speed motor to which a load is coupled through an elastic joint, which control apparatus has a speed detector for detecting the speed of the motor; a current detector for detecting an armature current of the motor; a speed regulator for synchronizing the detected speed of the motor to a target speed set from outside and for outputting a target current value; a current regulator for equalizing the detected armature current with the target current value set by the speed regulator and for generating a target voltage value, preferably with at least one filter connected thereto; a power converter for supplying appropriate electric power to the motor based on the target voltage value set by the current regulator; and a filter for filtering detected armature voltage and for outputting filtered armature voltage to the current regulator.

The above-described control apparatus is also provided with a third state observer and a fifth weighting adder, and the control apparatus preferably also incorporates a first amplifier and an adder. The amplifier calculates counter-electromotive force of the motor based on the detected speed of the motor and transmits the calculated counter-electromotive force. The adder adds the target voltage value set by the current regulator to the counter-electromotive force calculated by the first amplifier and transmits the resultant sum to the power converter. The third state observer estimates, based on the detected speed of the motor and the detected armature current, state variables including the speed of the motor, speed of the load and axial torque and puts out these state variables. The fifth weighting adder weights and adds the state variables set by the third state observer and the target current value set by the speed regulator and transmits the resultant sum to the current regulator. Optionally, a filter may be added to the control apparatus for filtering the detected armature voltage and transmitting the filtered armature voltage to the current regulator.

The present invention suppresses mechanical vibration in a mechanical system encompassing a load driven by a motor by utilizing a current regulator which either does not rely on the detected motor speed for control, or utilizes the detected motor speed only in the frequency region lower than the cutoff frequency of the motor speed detector. The present invention facilitates suppression of mechanical vibration by providing a control apparatus having characteristics of a small phase delay and a low gain in the high frequency range while avoiding any response deterioration or control error by increasing a feedback gain in the low frequency region. This effect is achieved either by means of a state observer that estimates, based on the detected armature current and armature voltage of the motor, state variables such as motor speed $\omega_M$, axial torque $\tau_S$, load torque $\tau_L$, and load speed $\omega_L$, or by means of a combination of a current regulator and at least one filter. In these manners, the control apparatus according to the present invention stably controls the motor speed by effectively suppressing mechanical vibration in the frequency region higher than the cutoff frequency of the motor speed detector.

DETAILED DESCRIPTION OF THE INVENTION

Figure 1:
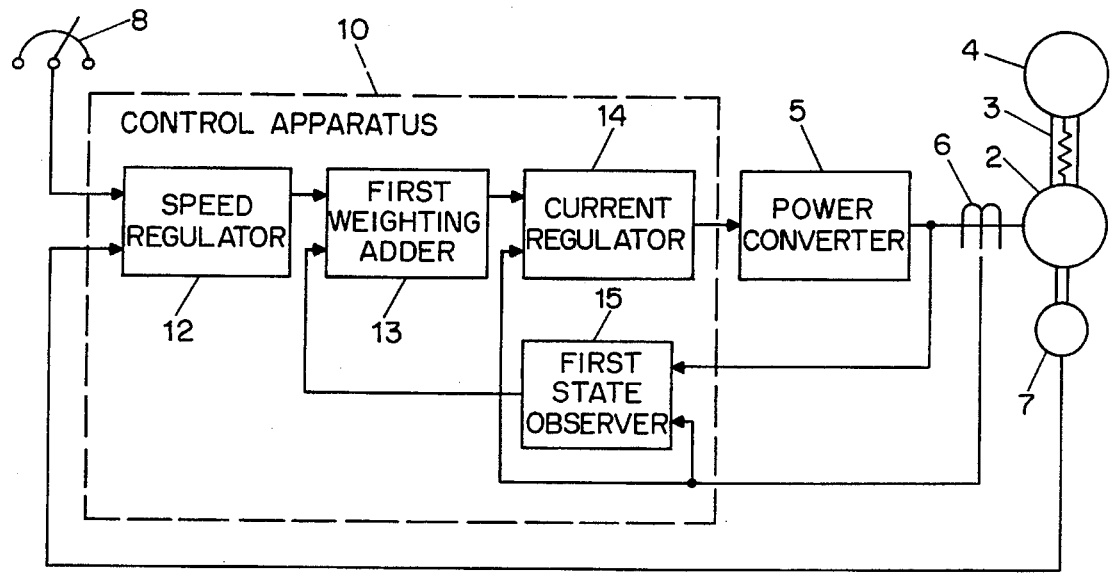
FIG. 1 is a block diagram showing a first embodiment of the present invention.
Figure 33:
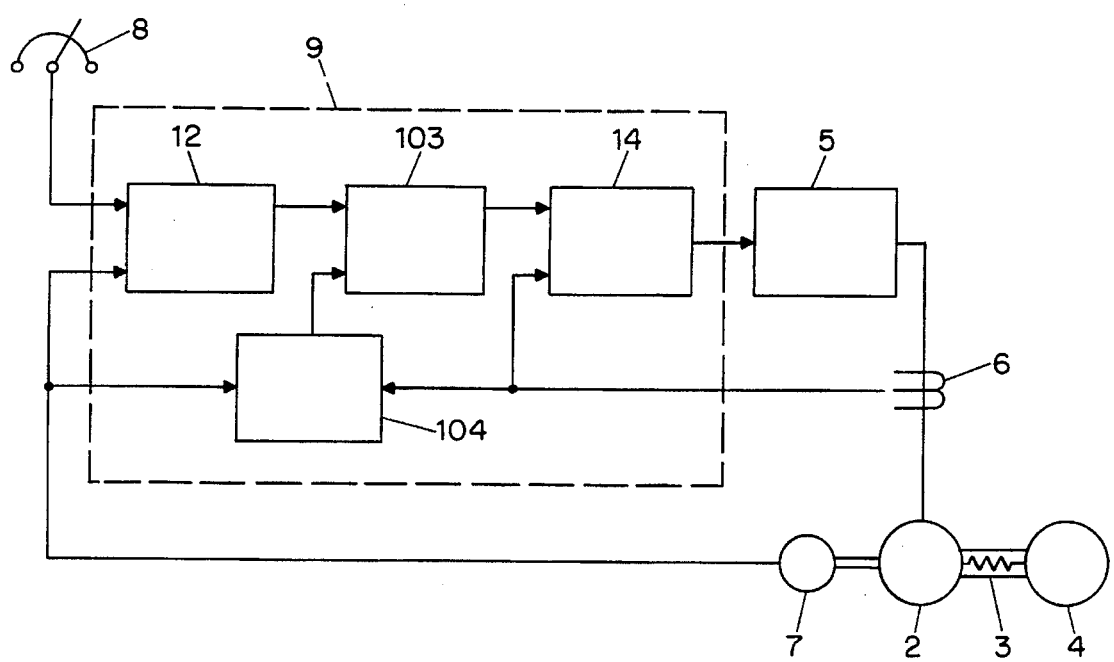
FIG. 33 is a block diagram showing a control device according to the prior art.

Shown as a block diagram in FIG. 1, a first embodiment of the present invention incorporates the motor 2, elastic joint 3, load 4, power converter 5, current detector 6, speed detector 7, target speed setting device 6, speed regulator 12 and current regulator 14, all of which are substantially identical as those shown in FIG. 33, and explanations of these elements are omitted for simplicity.

In the first embodiment, the speed regulator 12, a first weighting adder 13, a current regulator 14, and a first state observer 15 constitute a control apparatus 10. The first state observer 15 estimates, based on the detected current and voltage values, state variables including motor speed $\omega_M$, axial torque $\tau_S$, load speed $\omega_L$ and load torque $\tau_L$. Subsequently, the first state observer 15 transmits the estimated state variables to the first weighting adder 13. The first weighting adder 13 calculates a weighted sum of the target current value set by the speed regulator 12 and the estimated state variables. Subsequently, the first weighting adder transmits the resultant sum of the weighting addition to the current regulator 14.

As described in further detail below, vibration in the mechanical system is suppressed by inputting to the first state observer fluctuation of the detected current value caused by the vibration of the mechanical system. High frequency mechanical vibration which exceeds the cutoff frequency of the speed detector 7 can be suppressed since the first state observer does not utilize the motor-speed value detected by the speed detector 7 in estimating the state variables. A predetermined weight assigned to each input target value and each input state variable of the first weighting adder 13 is applied to the weighting adder prior to the adding operation. Different weighting adders which will be described later in conjunction with other embodiments are similarly provided with predetermined weight assignments for each input element.

Figure 2:
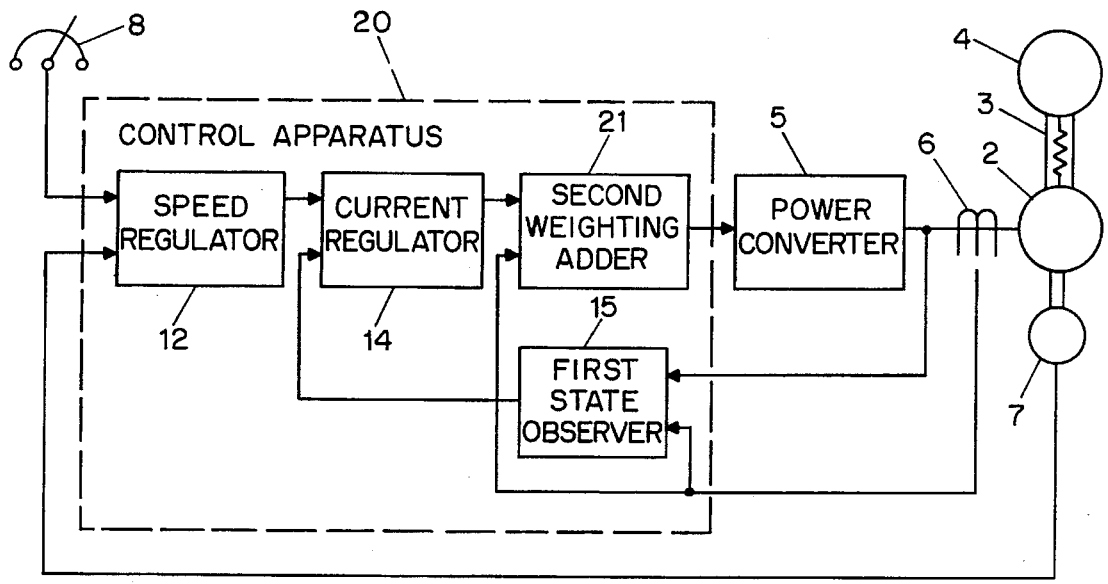
FIG. 2 is a block diagram showing a second embodiment of the present invention.

In a second embodiment of the present invention, shown as a block diagram in FIG. 2, the speed regulator 12, the current regulator 14, the first state observer 15, and a second weighting adder 21 constitute a control apparatus 20. The second weighting adder 21 calculates a weighted sum of state variables fed from the first state observer 15, to which the detected current and voltage values are inputted, and the target voltage value fed from the current regulator 14. The second weighting adder 21 transmits the resultant sum of the weighting addition as a new target voltage value to the power converter 5.

A high frequency mechanical vibration which exceeds the cutoff frequency of the speed detector 7 can be suppressed by the above-described control apparatus 20 due to the fact that, in estimating the state variables, the first state observer does not utilize the motor speed detected by the motor speed detector 7. In addition, the new target voltage value generated by the second weighting adder 21 changes sufficiently quickly in response to the high-frequency mechanical vibration.

With respect to the control apparatuses of the present invention shown in FIGS. 1 and 2, the armature voltage of the motor, as represented by a following equation 6, is equal to a sum of counter-electromotive force, which is proportional to the motor velocity $\omega_M$, and voltage drop attributable to armature resistance and leakage inductance. In equation 6, R represents the armature resistance, L the leakage inductance, $K_M$ a coefficient, $I_T$ a current component relevant to drive torque, and $V_T$ an armature voltage component relevant to the drive torque.

$$V_T = (R+S \cdot L) I_T + K_M \cdot \omega_M \qquad (6)$$

As can be seen from the equation, state variables of the mechanical system coupled to the motor, e.g., load speed $\omega_L$ and axial torque $\tau_S$ can be estimated by the state observer to which the armature voltage $V_T$ and armature current $I_T$ are fed. Accordingly, apparatuses shown in FIGS. 1 and 2 suppress vibrations in the mechanical system, irrespective of the cutoff frequency of the speed detector, by weighting and adding the estimated state variables and the target current value sent to the current regulator, or by weighting and adding the estimated state variables and the target voltage value generated by the current regulator.

Figure 3:
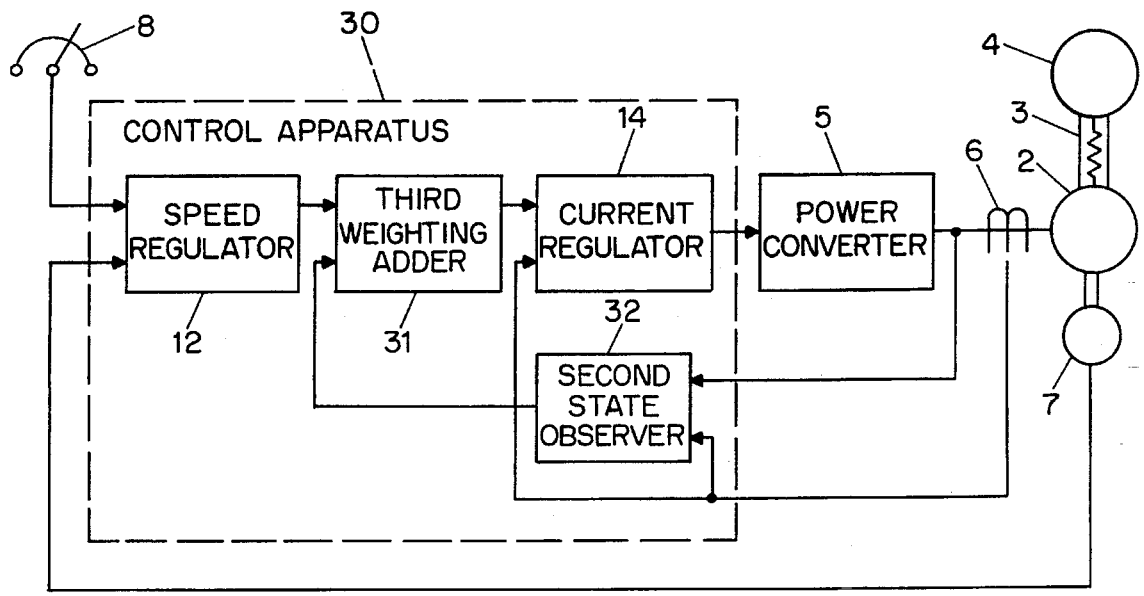
FIG. 3 is a block diagram showing a third embodiment of the present invention.

In a third embodiment of the present invention, shown as a block diagram in FIG. 3, the speed regulator 12, the current regulator 14, a third weighting adder 31 and a second state observer 32 constitute a control apparatus 30. The second state observer 32 differs from the first state observer of the first and second embodiments of the present invention in that the detected current value and the target voltage value, instead of the detected voltage value, are fed to the second state observer 32. Since the target voltage value is equal to the sum of the detected armature voltage value and control error component of output voltage of the power converter 5 (the control error component being the difference between the output voltage value of the power converter and the target voltage value), the control apparatus 30 of the third embodiment estimates the state variables and suppresses mechanical vibration according to the same principle utilized by the first and second embodiments of the present invention.

Figure 4:
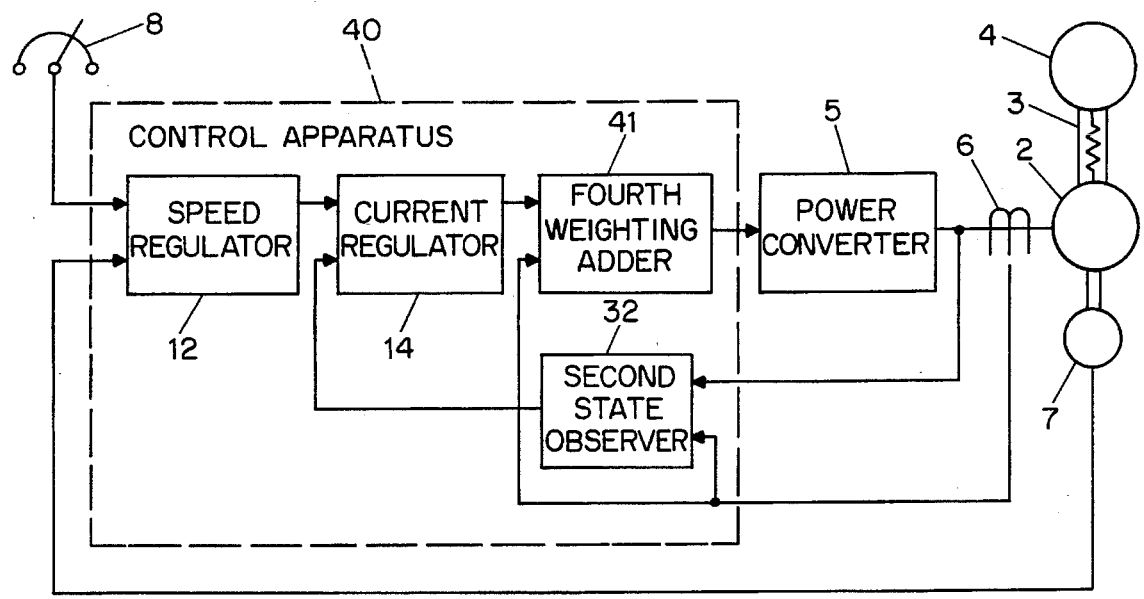
FIG. 4 is a block diagram showing a fourth embodiment of the present invention.

In a fourth embodiment of the present invention, shown as a block diagram in FIG. 4, the speed regulator 12, the current regulator 14, the second state observer 32, and a fourth weighting adder 41 constitute a control apparatus 40. The fourth weighting adder 41 differs from the third weighting adder 31 that calculates a weighted sum of the target current value and the output of the second state observer 32; the fourth weighting adder 41 weights and adds (or performs a "weighting addition" of) the target voltage value and the output of the second state observer 32.

As mentioned above, the control apparatuses of FIGS. 3 and 4 exploit the fact that the target voltage value sent from the current regulator to the power converter is equal to a sum of the armature voltage and the control error component of output voltage of the power converter. The state variables of the mechanical system coupled to the motor, e.g., load speed $\omega_L$ and axial torque $\tau_S$, are estimated by the state observer by using the target voltage value, the armature current value $I_T$ and the above-mentioned error component. The vibrations in the mechanical system can be suppressed, irrespective of the cutoff frequency of the speed detector, by weighting and adding the thus estimated state variables and the target current value sent to the current regulator, as in the third embodiment of the present invention, or by weighting and adding the estimated state variables and the target voltage value generated by the current regulator, as in the fourth embodiment of the present invention.

The control apparatuses shown in FIGS. 5, 19, 20, 28, 31, 32 and 34 take advantage of the fact that the vibration in the mechanical system can be suppressed, irrespective of the cutoff frequency of the speed detector, by adjusting transfer characteristics of current control to exhibit desired gain and phase around the resonance frequency region of the mechanical system. The transfer characteristics are obtained by a combination of a filter and the current regulator.

Because the current regulator is influenced by vibration components of the motor speed when vibrations occur in the mechanical system, the armature current fluctuates. A small change $\Delta I_T$ of the armature current $I_T$ is expressed by a following equation 7 which considers the target current value $I_T^*$ and the motor speed $\omega_M$. In equation 7, $G_R(s)$ represents a transfer function from target current value input to the current regulator to target voltage value output from the current regulator, $G_F(s)$ represents a transfer function from detected armature current value input to the current regulator to target voltage value output from the current regulator, and $T_D$ represents a delay period in the power converter (also referred to as "control dead time") between the issuance of a command to change the armature voltage and the instant at which the adjusted voltage appears across the armature. In equation 7, $\Delta I_T^*$ is a small change of the target current value, $\Delta \omega_M$ is a small change of the motor speed, R is winding resistance, L is leakage inductance, and $K_M$ is a coefficient.

$$\Delta I_T = \frac{e^{-sT_D} G_R(s) \cdot \Delta I_T^* - e^{-sT_D} G_F(s) \cdot \Delta I_T - K_M \cdot \Delta \omega_M}{R + s \cdot L} \qquad (7)$$

$$= \frac{e^{-sT_D} G_R(s) \cdot \Delta I_T^* - K_M \cdot \Delta \omega_M}{e^{-sT_D} G_F(s) + R + s \cdot L}$$

By substituting equation 4 by equations 7 and 5, we obtain a following equation 8.

$$\Delta \omega_M = \frac{s^2 + (K_S/J_L)}{s[J_M \cdot s^2 + K_S(1 + J_M/J_L)]} \cdot K_T \cdot \Delta I_T \qquad (8)$$

$$= \frac{[s^2 + (K_S/J_L)]K_T[e^{-sT_D} G_R(s) \cdot \Delta I_T^* - K_M \cdot \Delta \omega_M]}{s[J_M \cdot s^2 + K_S(1 + J_M/J_L)] e^{-sT_D} G_F(s) + R + s \cdot L}$$

$$= \frac{\dfrac{1}{e^{-sT_D}G_f(s) + R + s \cdot L} \cdot \dfrac{[s^2 + (K_S/J_L)]K_T e^{-sT_D}G_R(s)}{s[J_M \cdot s^2 + K_S(1 + J_M/J_L)]}}{1 + \dfrac{1}{e^{-sT_D}G_F(s) + R + s \cdot L} \cdot \dfrac{[s^2 + (K_S/J_L)]K_T \cdot K_M}{s[J_m \cdot s^2 + K_S(1 + J_m/J_L)]}} \times \Delta I^*_T$$

The second term in the denominator of equation 8 is a one-cycle transfer function of a current control loop. According to the classic control theory, stable control may be executed at a frequency at which a loop gain is less than 1, provided that a phase delay of less than 180° is maintained. To suppress mechanical vibration by using the current regulator, the current regulator should preferably have characteristics which include a small phase delay and a low gain of the transfer function $G_R(s)$ in a high frequency region because the power converter shows a delay caused by the control dead time $T_D$ described above. Furthermore, by utilizing at least one filter combined with the current regulator, response deterioration and control error can be prevented by increasing the feedback gain in a low frequency region.

Figure 5:
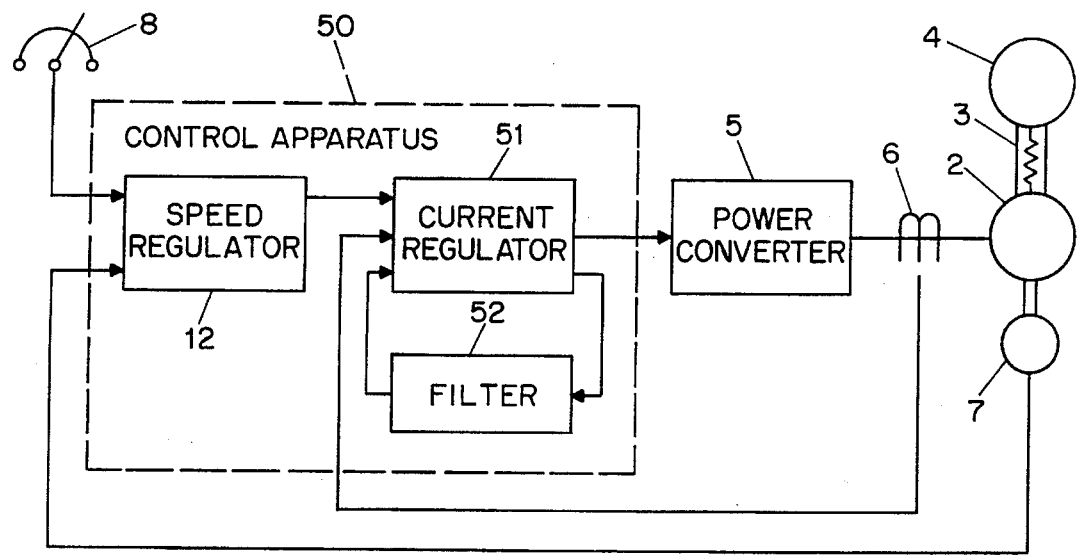
FIG. 5 is a block diagram showing a fifth embodiment of the present invention.

In a fifth embodiment of the present invention, shown as a block diagram in FIG. 5, the speed regulator 12, a current regulator 51, and a filter 52 constitute a control apparatus 50. The control apparatus 50, in which the filter 52 is coupled with the current regulator 51, suppresses mechanical vibrations by having the filter and current regulator combination provide frequency characteristics of small phase delay and low gain in the high frequency region. In addition, the control apparatus of FIG. 5 achieves increased feedback gain in the low frequency region to prevent response deterioration and control errors.

Figure 6:
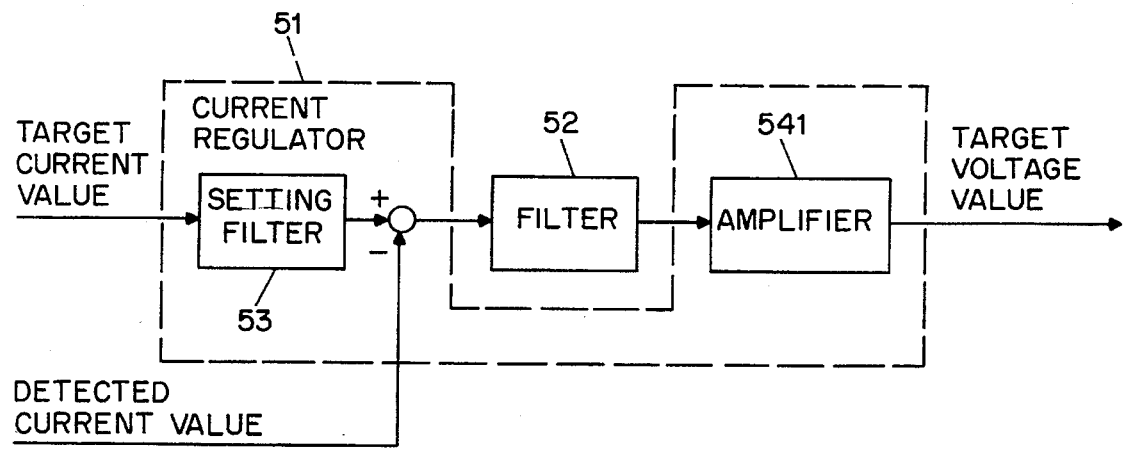
FIG. 6 is a block diagram showing a first detailed circuit configuration connecting the filter 52 and the current regulator 51 of the fifth embodiment shown in FIG. 5.

FIG. 6 is a block diagram showing a first circuit configuration connecting the filter 52 and the current regulator 51 of the fifth embodiment shown in FIG. 5. In FIG. 6, a setting filter 53 and an amplifier 541 constitute the current regulator 51. Although the setting filter 53 is provided only to filter the target current value, each of the subsequent circuit configurations described below, connecting the filter 52 and the current regulator 51, is provided with the setting filter 53.

Figure 7:
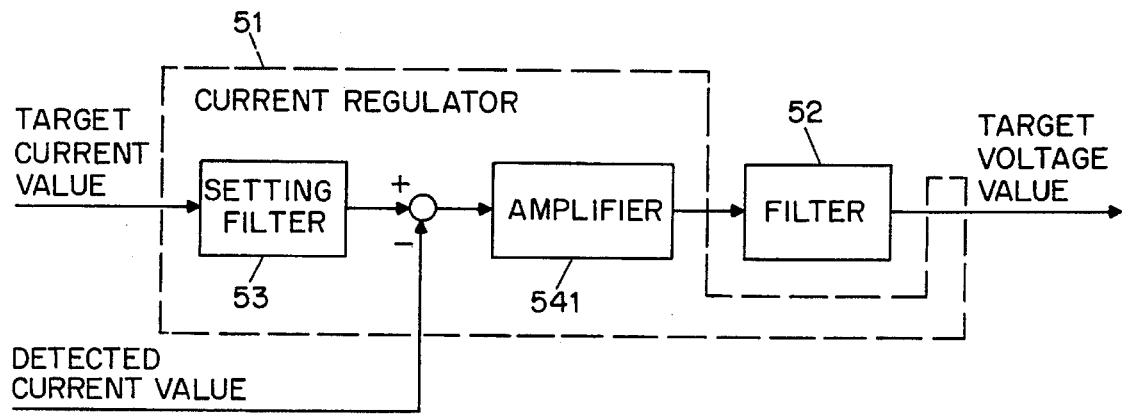
FIG. 7 is a block diagram showing a second detailed circuit configuration connecting the filter 52 and the current regulator 51 of the fifth embodiment shown in FIG. 5.

FIG. 7 is a block diagram showing a second circuit configuration connecting the filter 52 and the current regulator 51 of the fifth embodiment shown in FIG. 5. As seen in FIG. 7, although the setting filter 53 and amplifier 541 once again constitute the current regulator 51 in FIG. 7, connection among the setting filter 53, amplifier 541 and current regulator 51 is different from the configuration shown in FIG. 6.

Figure 8:
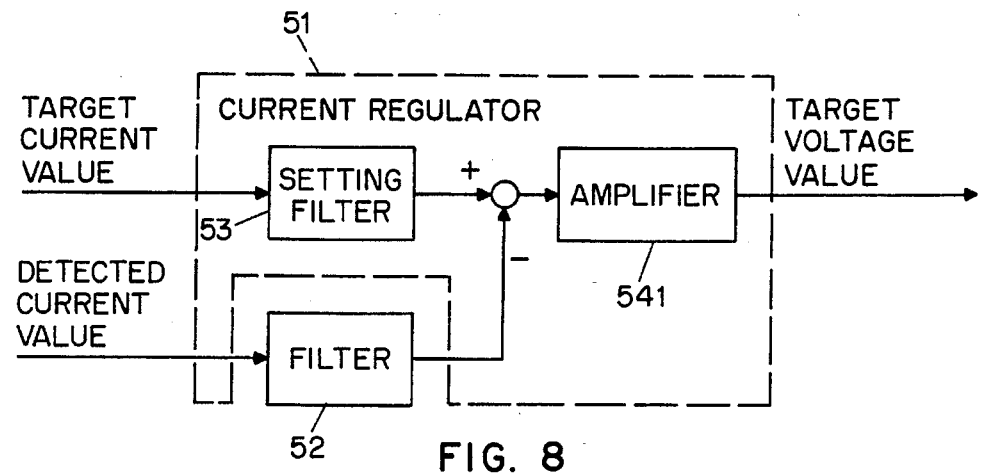
FIG. 8 is a block diagram showing a third detailed circuit configuration connecting the filter 52 and the current regulator 51 of the fifth embodiment shown in FIG. 5.

FIG. 8 is a block diagram showing a third circuit configuration connecting the filter 52 and the current regulator 51 of the fifth embodiment shown in FIG. 5. Once again, the setting filter 53 and amplifier 541 constitute the current regulator 51. As seen in FIG. 8, connection among the setting filter 53, amplifier 541 and current regulator 51 is different from the configurations shown in FIGS. 6 and 7.

Figure 9:
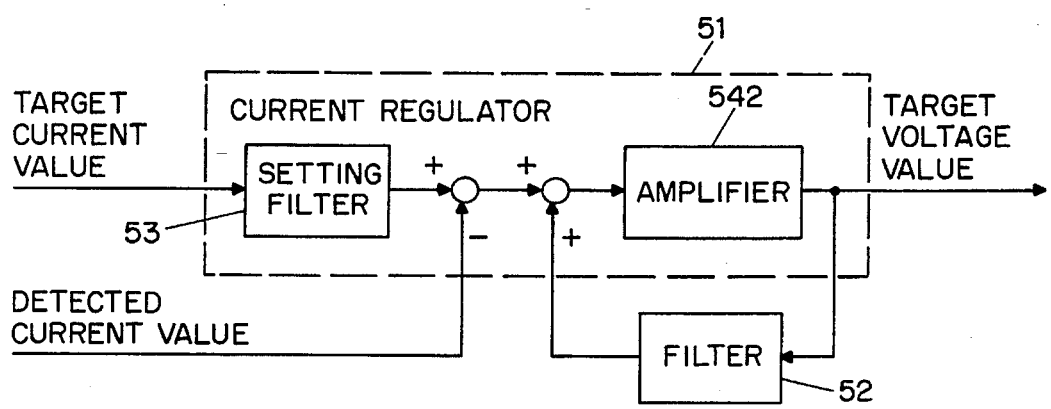
FIG. 9 is a block diagram showing a fourth detailed circuit configuration connecting the filter 52 and the current regulator 51 of the fifth embodiment shown in FIG. 5.

FIG. 9 is a block diagram showing a fourth circuit configuration connecting the filter 52 and the current regulator 51 of the fifth embodiment of FIG. 5. In FIG. 9, the setting filter 53 and an amplifier 542 constitute the current regulator 51.

Figure 10:
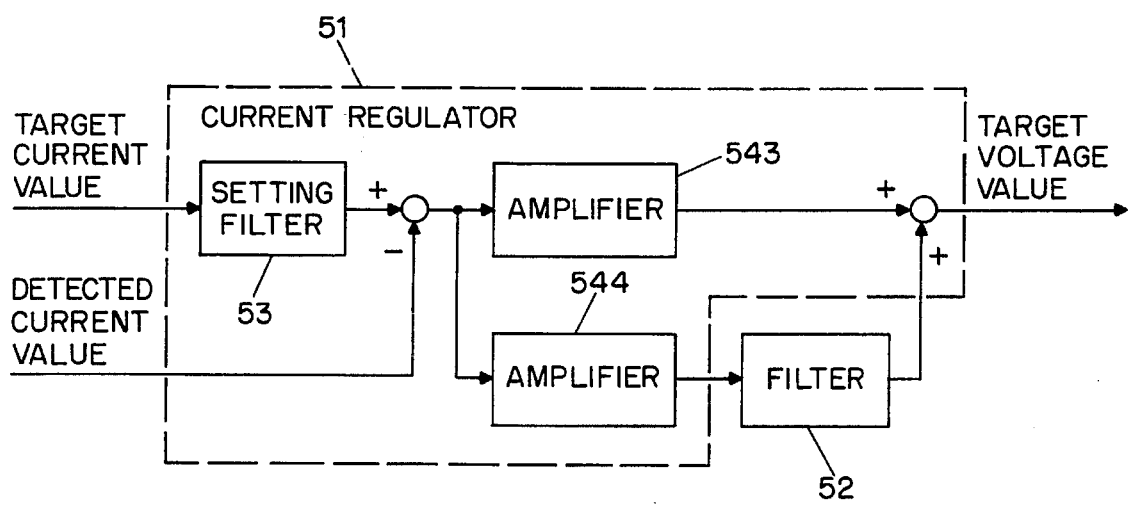
FIG. 10 is a block diagram showing a fifth detailed circuit configuration connecting the filter 52 and the current regulator 51 of the fifth embodiment shown in FIG. 5.

Shown in FIG. 10 is a fifth circuit configuration connecting the filter 52 and the current regulator 51 of the fifth embodiment shown in FIG. 5. In FIG. 10, the setting filter 53 and two amplifiers 543 and 544 constitute the current regulator 51.

Figure 11:
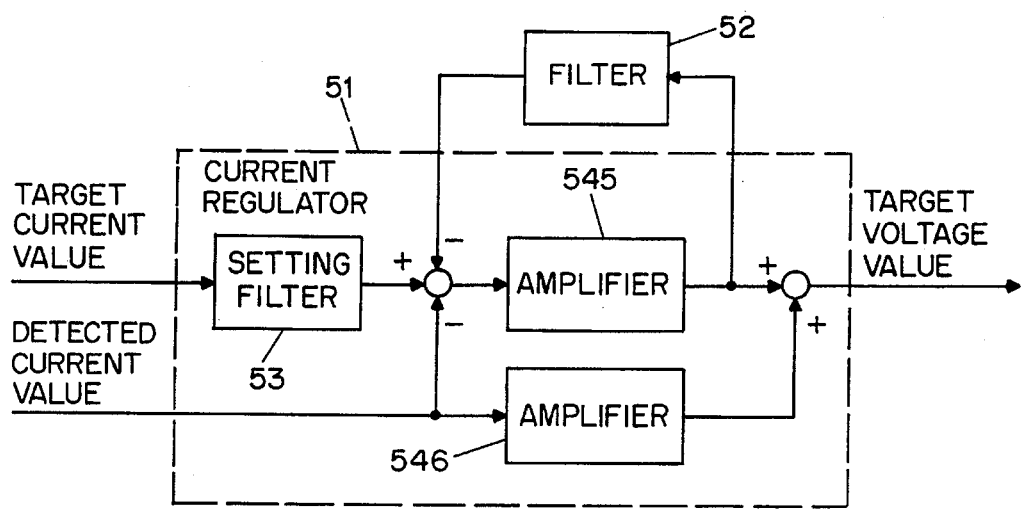
FIG. 11 is a block diagram showing a sixth detailed circuit configuration connecting the filter 52 and the current regulator 51 of the fifth embodiment shown in FIG. 5.

Shown in FIG. 11 is a sixth circuit configuration connecting the filter 52 and the current regulator 51 of the fifth embodiment shown in FIG. 5. In FIG. 11, the setting filter 53 and two amplifiers 545 and 546 constitute the current regulator 51.

Figure 12:
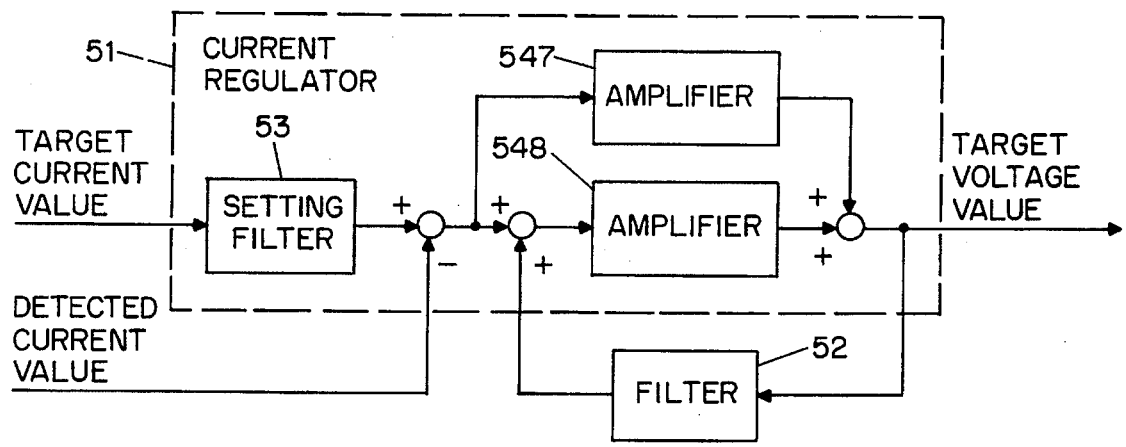
FIG. 12 is a block diagram showing a seventh detailed circuit configuration connecting the filter 52 and the current regulator 51 of the fifth embodiment shown in FIG. 5.

Shown in FIG. 12 is a seventh circuit configuration connecting the filter 52 and the current regulator 51 of the fifth embodiment shown in FIG. 5. In FIG. 12, the setting filter 53 and two amplifiers 547 and 548 constitute the current regulator 51.

Figure 13:
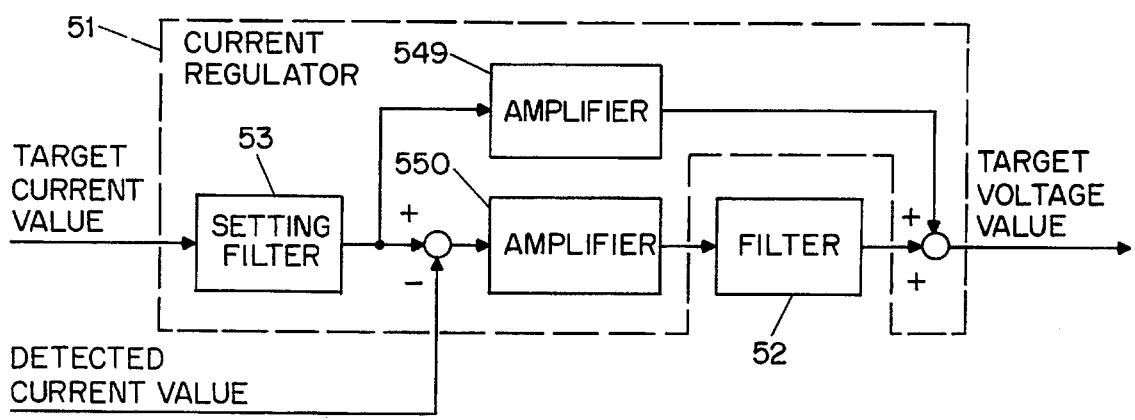
FIG. 13 is a block diagram showing an eighth detailed circuit configuration connecting the filter 52 and the current regulator 51 of the fifth embodiment shown in FIG. 5.

Shown in FIG. 13 is an eighth circuit configuration connecting the filter 52 and the current regulator 51 of the fifth embodiment shown in FIG. 5. In FIG. 13, the setting filter 53 and two amplifiers 549 and 550 constitute the current regulator 51.

Figure 14:
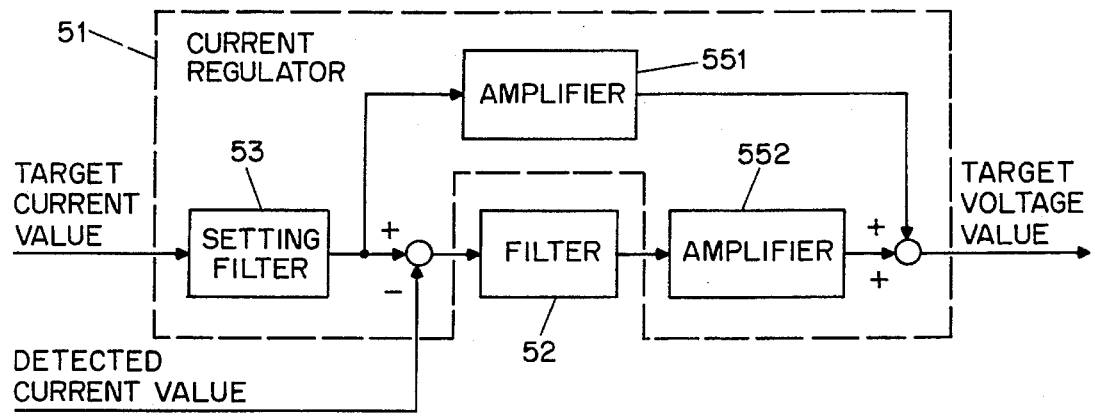
FIG. 14 is a block diagram showing a ninth detailed circuit configuration connecting the filter 52 and the current regulator 51 of the fifth embodiment shown in FIG. 5.

Shown in FIG. 14 is a ninth circuit configuration connecting the filter 52 and the current regulator 51 of the fifth embodiment shown in FIG. 5. In FIG. 14, the setting filter 53 and two amplifiers 551 and 552 constitute the current regulator 51.

Figure 15:
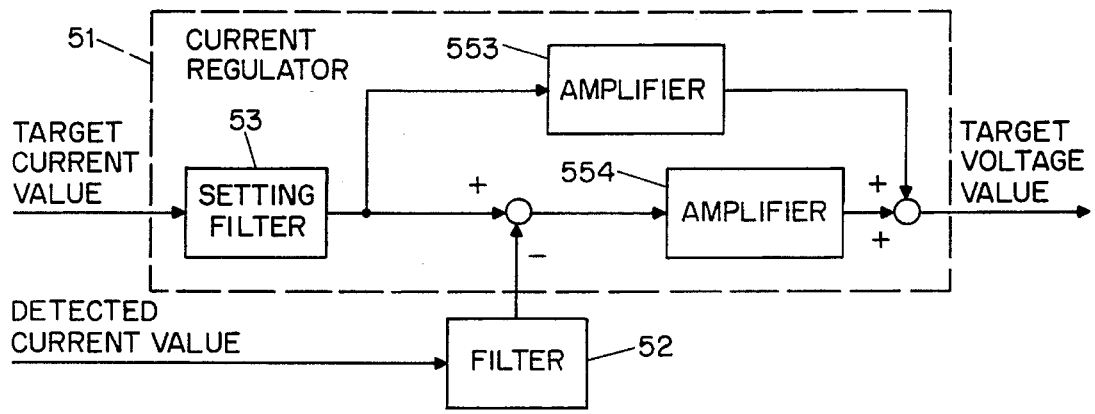
FIG. 15 is a block diagram showing a tenth detailed circuit configuration connecting the filter 52 and the current regulator 51 of the fifth embodiment shown in FIG. 5.

Shown in FIG. 15 is a tenth circuit configuration connecting the filter 52 and the current regulator 51 of the fifth embodiment shown in FIG. 5. In FIG. 15, the setting filter 53 and two amplifiers 553 and 554 constitute the current regulator 51.

Figure 16:
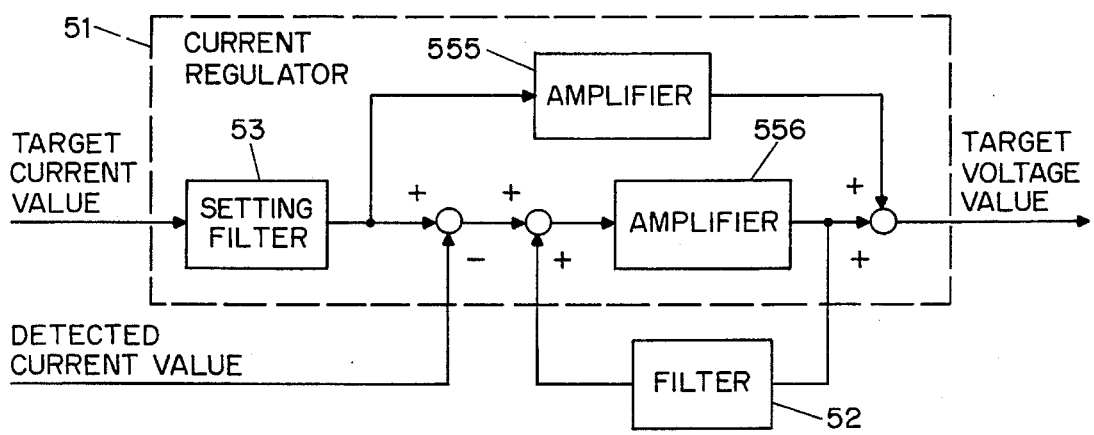
FIG. 16 is a block diagram showing an eleventh detailed circuit configuration connecting the filter 52 and the current regulator 51 of the fifth embodiment shown in FIG. 5.

Shown in FIG. 16 is an eleventh circuit configuration connecting the filter 52 and the current regulator 51 of the fifth embodiment shown in FIG. 5. In FIG. 16, the setting filter 53 and two amplifiers 555 and 556 constitute the current regulator 51.

Figure 17:
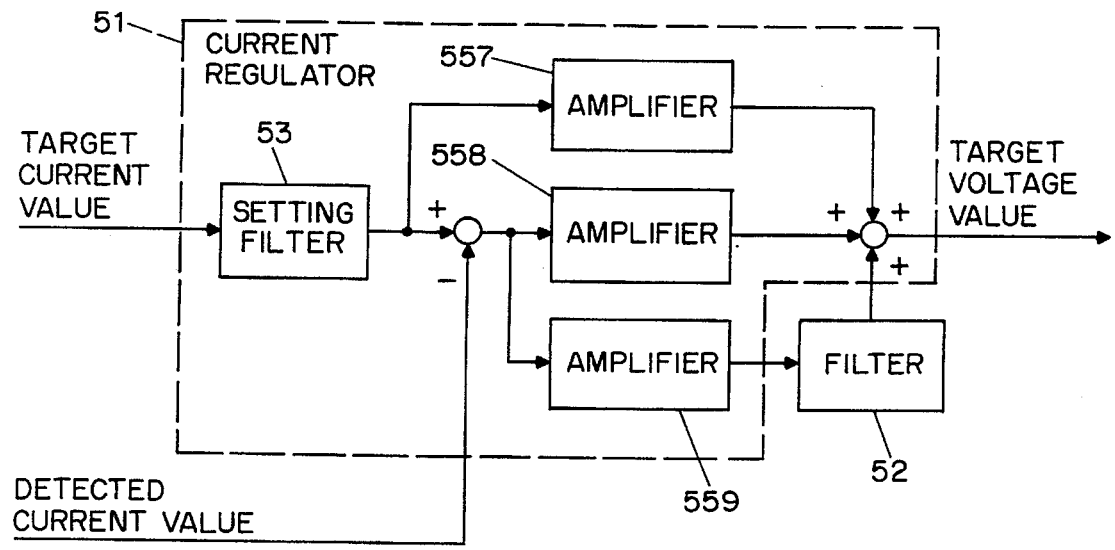
FIG. 17 is a block diagram showing a twelfth detailed circuit configuration connecting the filter 52 and the current regulator 51 of the fifth embodiment shown in FIG. 5.

Shown in FIG. 17 is a twelfth circuit configuration connecting the filter 52 and the current regulator 51 of the fifth embodiment shown in FIG. 5. In FIG. 17, the setting filter 53 and three amplifiers 557, 558 and 559 constitute the current regulator 51.

Figure 18:
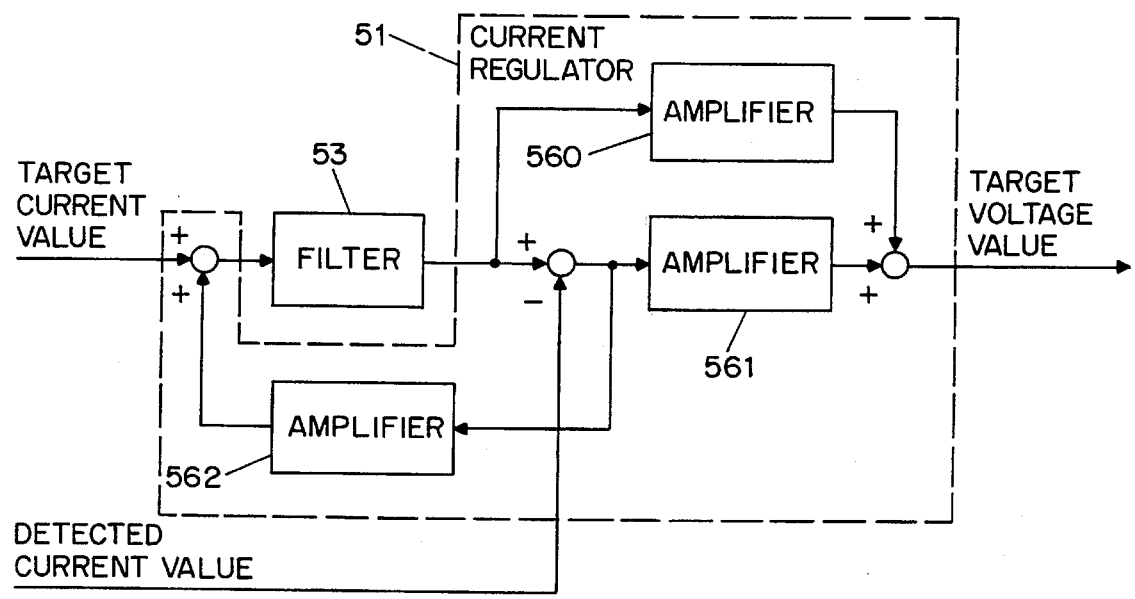
FIG. 18 is a block diagram showing a thirteenth detailed circuit configuration connecting the filter 52 and the current regulator 51 of the fifth embodiment shown in FIG. 5.

Shown in FIG. 18 is a thirteenth circuit configuration connecting the filter 52 and the current regulator 51 of the fifth embodiment shown in FIG. 5. In FIG. 18, the setting filter 53 and three amplifiers 560, 561 and 562 constitute the current regulator 51.

Figure 19:
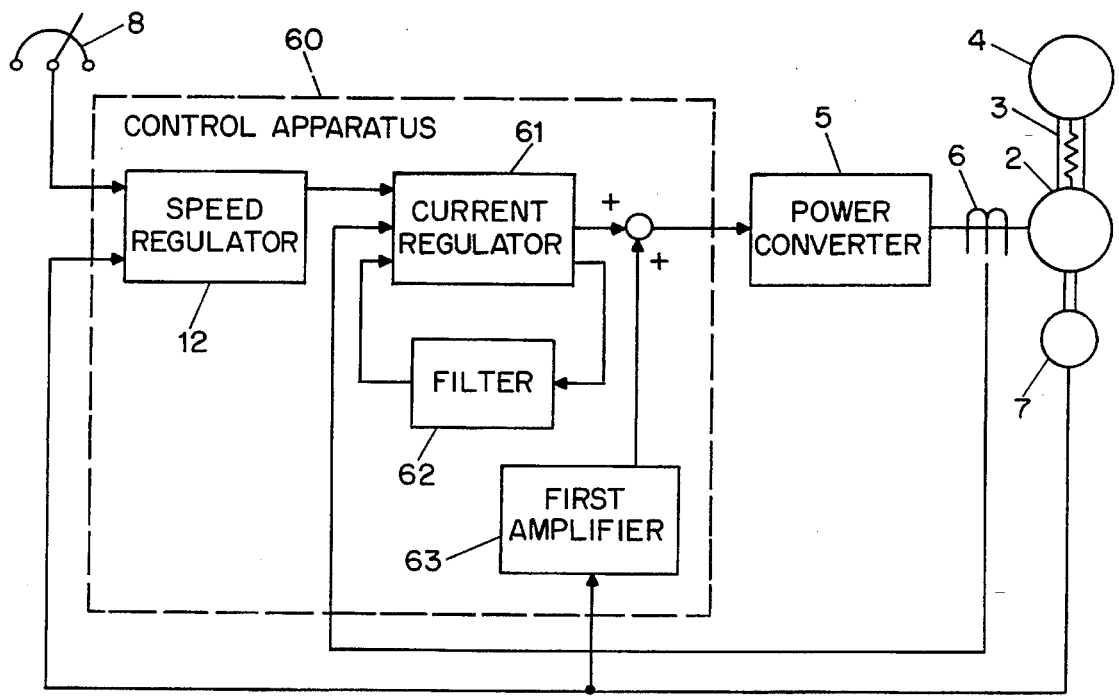
FIG. 19 is a block diagram showing a sixth embodiment of the present invention.

In a sixth embodiment of the present invention, shown as a block diagram in FIG. 19, the speed regulator 12, a current regulator 61, a filter 62, and a first amplifier 63 constitute a control apparatus 60. The first amplifier 63 calculates counter-electromotive force of the motor 2 at the motor speed detected and fed by the speed detector 7. The target voltage value generated by the current regulator 61 is corrected by the calculated counter-electromotive force to improve control response. As in the fifth embodiment of the present invention described earlier, the combination of the current regulator 61 and the filter 62 suppresses mechanical vibrations of high frequencies that the speed detector 7 can not detect.

Figure 20:
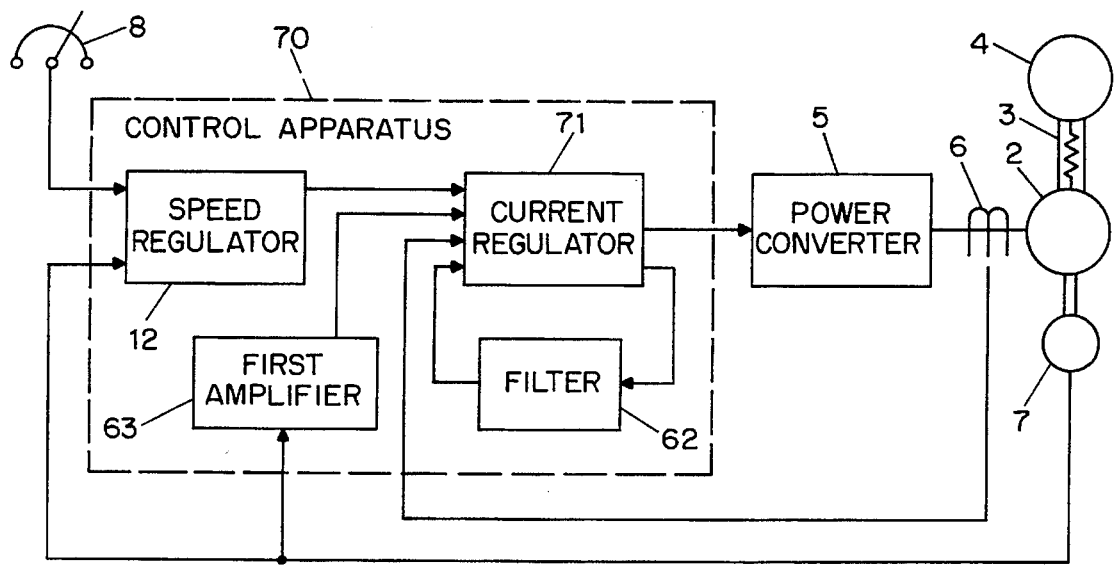
FIG. 20 is a block diagram showing a seventh embodiment of the present invention.

In a seventh embodiment of the present invention, shown as a block diagram in FIG. 20, the speed regulator 12, a current regulator 71, the filter 62, and the first amplifier 63 constitute a control apparatus 70. Although the first amplifier 63 of the seventh embodiment calculates counter-electromotive force of the motor 2 at the detected motor speed as in the sixth embodiment, the seventh embodiment differs from the sixth embodiment in that the first amplifier 63 transmits the calculated counter-electromotive force to the current regulator 71. The seventh embodiment exhibits the same operational function and effect exhibited by the sixth embodiment of the present invention in suppressing mechanical vibrations of high frequencies.

Figure 21:
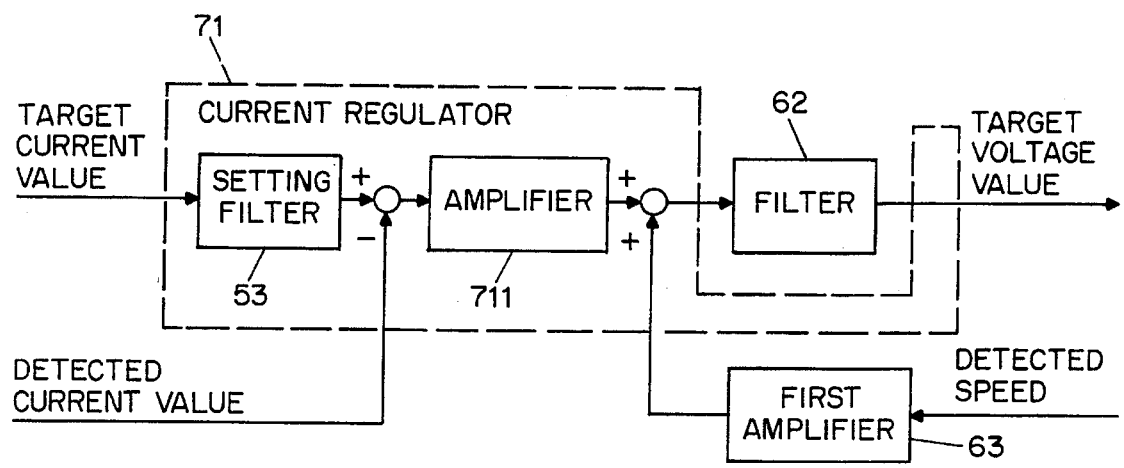
FIG. 21 is a block diagram showing a first detailed circuit configuration connecting the current regulator 71, the filter 62 and the first amplifier 63 of the seventh embodiment shown in FIG. 20.

Shown as a block diagram in FIG. 21 is a first circuit configuration connecting the current regulator 71, the filter 62 and the first amplifier 63 of the seventh embodiment shown in FIG. 20. In FIG. 21, the setting filter 53, the function of which has been already described in connection with the circuit configuration shown in FIG. 6, and an amplifier 711 constitute the current regulator 71.

Figure 22:
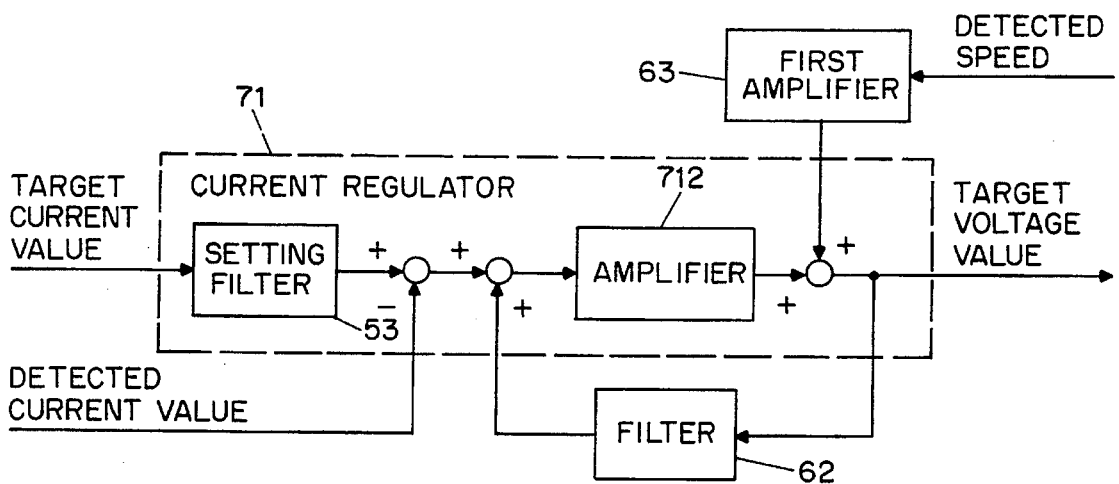
FIG. 22 is a block diagram showing a second detailed circuit configuration connecting the current regulator 71, the filter 62 and the first amplifier 63 of the seventh embodiment shown in FIG. 20.

Shown in FIG. 22 is a second circuit configuration connecting the current regulator 71, the filter 62 and the first amplifier 63 of the seventh embodiment shown in FIG. 20. In FIG. 22, the setting filter 53 and an amplifier 712 constitute the current regulator 71.

Figure 23:
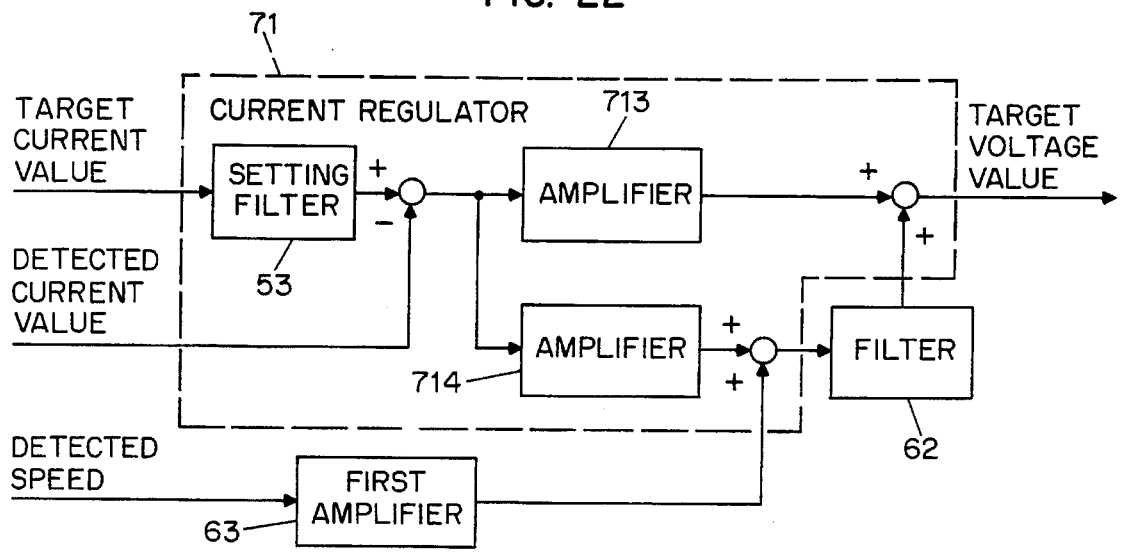
FIG. 23 is a block diagram showing a third detailed circuit configuration connecting the current regulator 71, the filter 62 and the first amplifier 63 of the seventh embodiment shown in FIG. 20.

Shown in FIG. 23 is a third circuit configuration connecting the current regulator 71, the filter 62 and the first amplifier 63 of the seventh embodiment shown in FIG. 20. In FIG. 23, the setting filter 53 and two amplifiers 713 and 714 constitute the current regulator 71.

Figure 24:
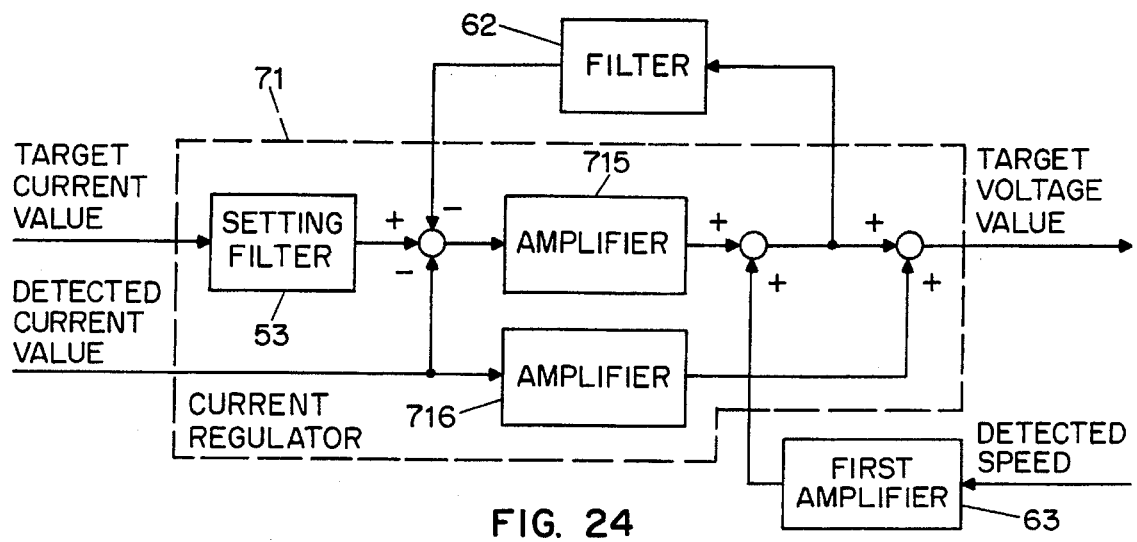
FIG. 24 is a block diagram showing a fourth detailed circuit configuration connecting the current regulator 71, the filter 62 and the first amplifier 63 of the seventh embodiment shown in FIG. 20.

Shown in FIG. 24 is a fourth circuit configuration connecting the current regulator 71, the filter 62 and the first amplifier 63 of the seventh embodiment shown in FIG. 20. In FIG. 24, the setting filter 53 and two amplifiers 715 and 716 constitute the current regulator 71.

Figure 25:
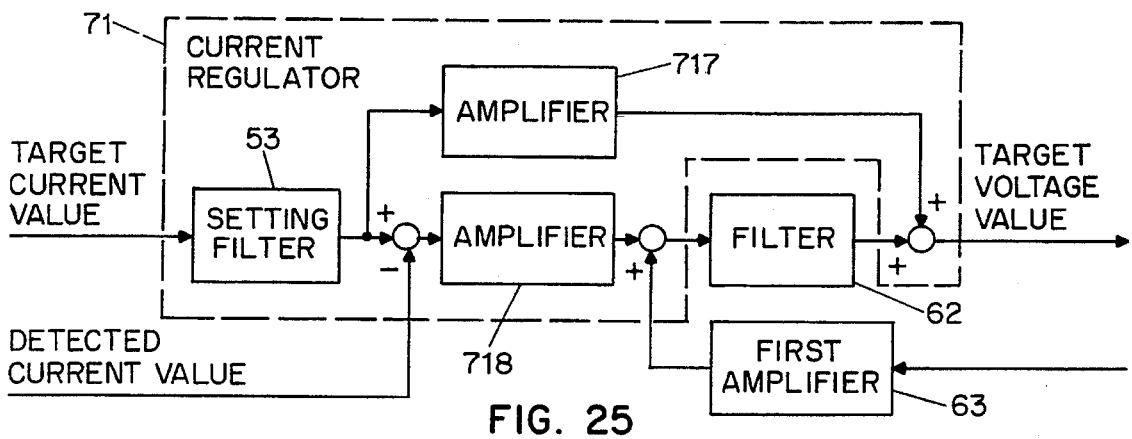
FIG. 25 is a block diagram showing a fifth detailed circuit configuration connecting the current regulator 71, the filter 62 and the first amplifier 63 of the seventh embodiment shown in FIG. 20.

Shown in FIG. 25 is a fifth circuit configuration connecting the current regulator 71, the filter 62 and the first amplifier 63 of the seventh embodiment shown in FIG. 20. In FIG. 25, the setting filter 53 and two amplifiers 717 and 718 constitute the current regulator 71.

Figure 26:
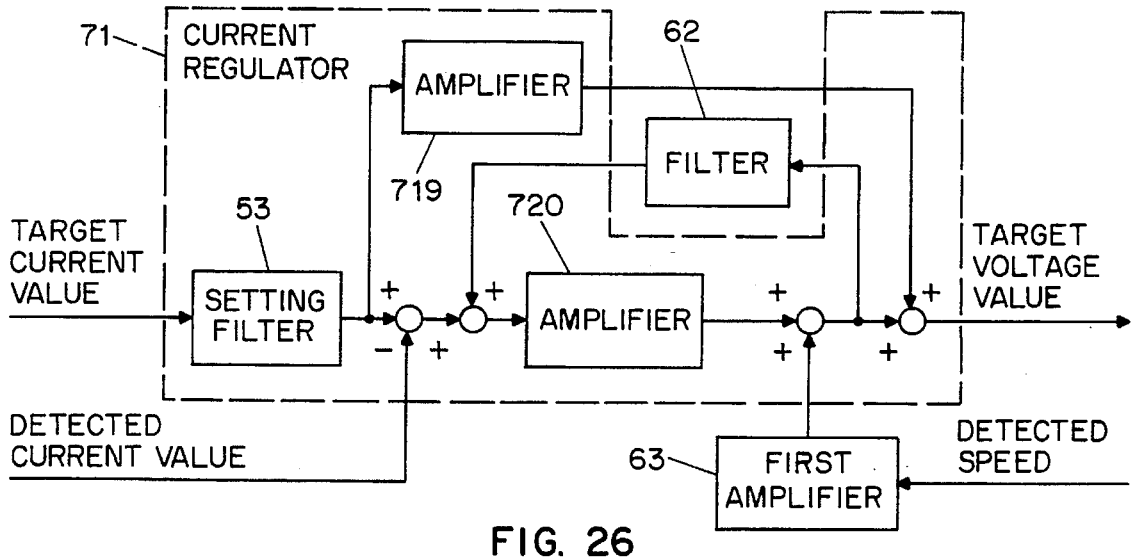
FIG. 26 is a block diagram showing a sixth detailed circuit configuration connecting the current regulator 71, the filter 62 and the first amplifier 63 of the seventh embodiment shown in FIG. 20.

Shown in FIG. 26 is a sixth circuit configuration connecting the current regulator 71, the filter 62 and the first amplifier 63 of the seventh embodiment shown in FIG. 20. In FIG. 26, the setting filter 53 and two amplifiers 719 and 720 constitute the current regulator 71.

Figure 27:
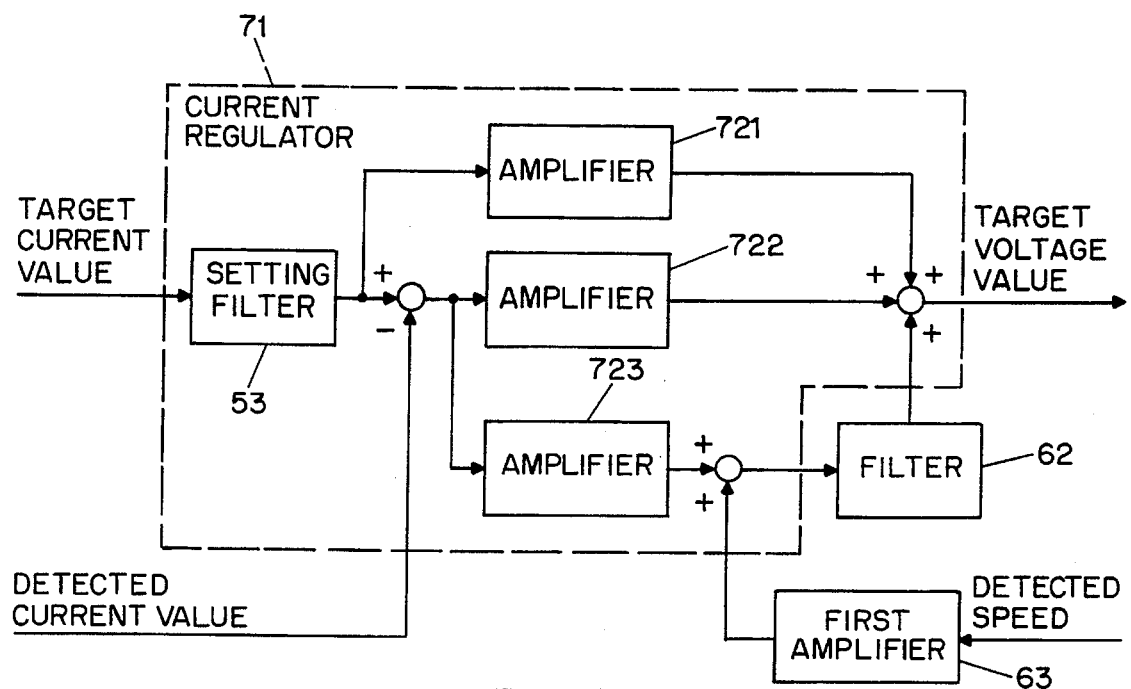
FIG. 27 is a block diagram showing a seventh detailed circuit configuration connecting the current regulator 71, the filter 62 and the first amplifier 63 of the seventh embodiment shown in FIG. 20.

Shown in FIG. 27 is a seventh circuit configuration connecting the current regulator 71, the filter 62 and the first amplifier 63 of the seventh embodiment shown in FIG. 20. In FIG. 27, a setting filter 53 and three amplifiers 721, 722 and 723 constitute the current regulator 71.

Figure 28:
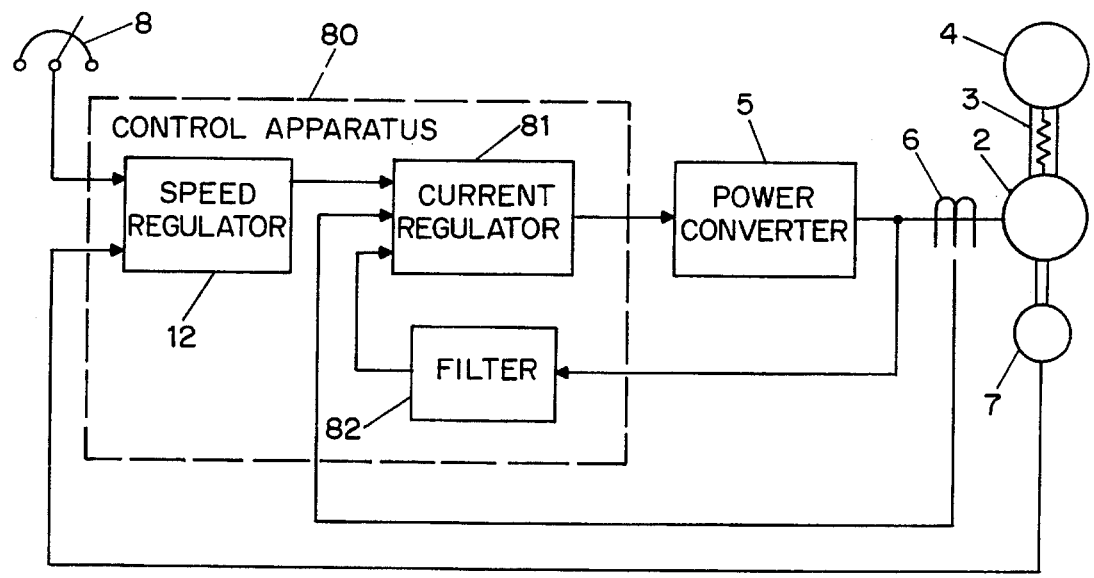
FIG. 28 is a block diagram showing an eighth embodiment of the present invention.

In an eighth embodiment of the present invention, shown as a block diagram in FIG. 28, the speed regulator 12, a current regulator 81, and a filter 82 constitute a control apparatus 80. The eighth embodiment differs from the fifth embodiment shown in FIG. 5 in that the detected current value is fed to the filter 82, the output of which filter is fed to the current regulator 81.

Figure 29:
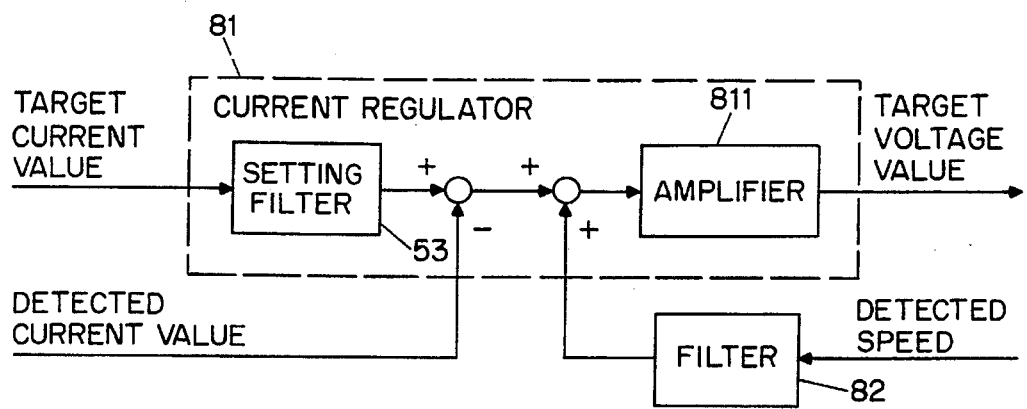
FIG. 29 is a block diagram showing a first detailed circuit configuration connecting the current regulator 81 and the filter 82 of the eighth embodiment of the present invention shown in FIG. 28.

Shown in FIG. 29 is a first circuit configuration connecting the current regulator 81 and the filter 82 of the eighth embodiment shown in FIG. 28. In FIG. 29, the setting filter 53, the function of which has been described earlier in connection with the circuit configuration shown in FIG. 6, and an amplifier 811 constitute the current regulator 81.

Figure 30:
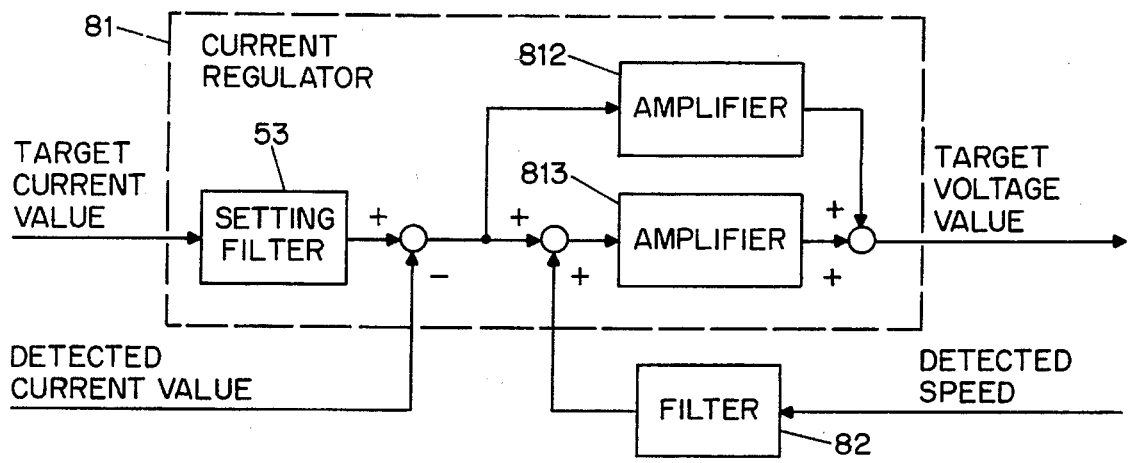
FIG. 30 is a block diagram showing a second detailed circuit configuration connecting the current regulator 81, and the filter 82 of the eighth embodiment of the present invention shown in FIG. 28.

Shown in FIG. 30 is a second circuit configuration connecting the current regulator 81 and the filter 82 of the eighth embodiment shown in FIG. 28. In FIG. 30, the setting filter 53 and two amplifiers 812 and 813 constitute the current regulator 81.

Figure 31:
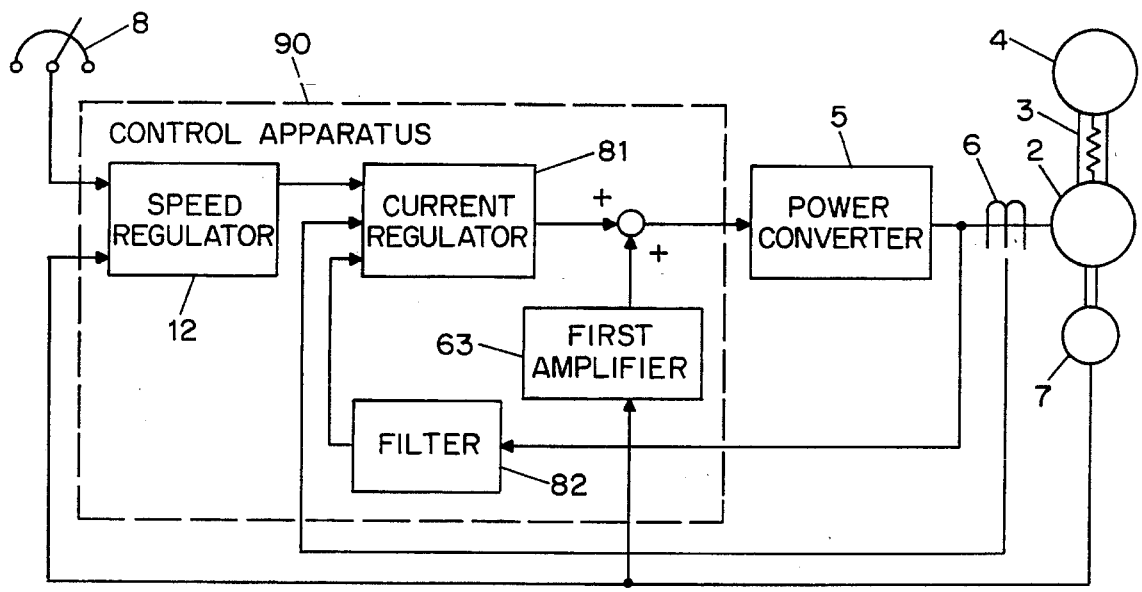
FIG. 31 is a block diagram showing a ninth embodiment of the present invention.

In a ninth embodiment of the present invention, shown as a block diagram in FIG. 31, the speed regulator 12, the first amplifier 63, the current regulator 81 and the filter 82 constitute a control apparatus 90. The ninth embodiment differs from the eighth embodiment shown in FIG. 28 in that the detected speed value is fed to the first amplifier 63, which puts out the calculated counter-electromotive force as in the seventh embodiment shown in FIG. 19. In addition, as seen in FIG. 31, an adder adds the target voltage value and the calculated counter-electromotive force, the result of which addition is transmitted to the power converter.

Figure 32:
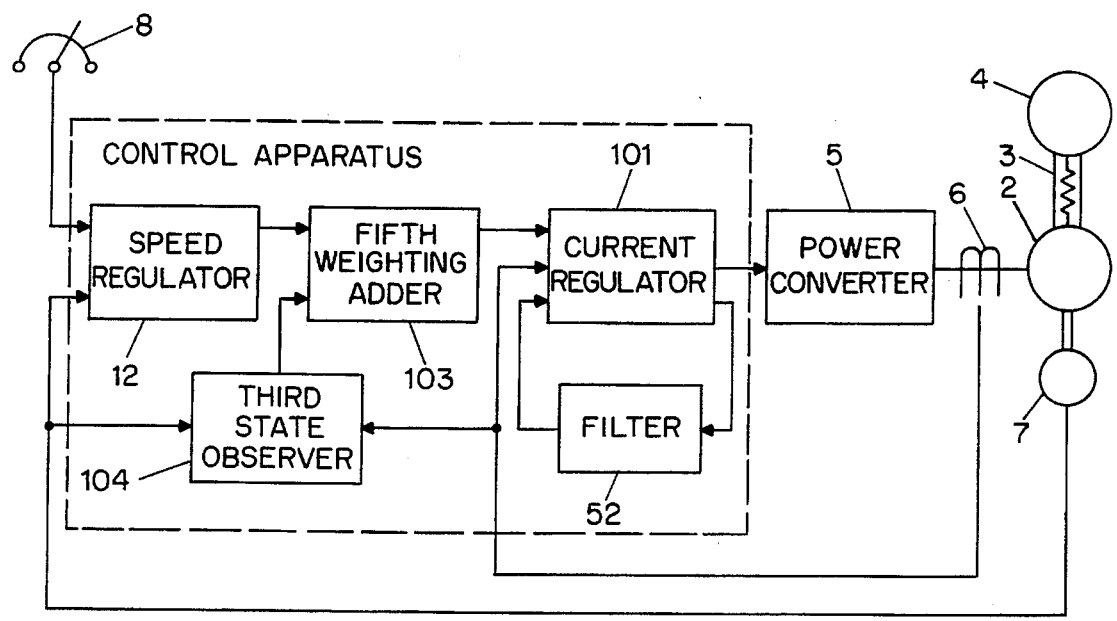
FIG. 32 is a block diagram showing a tenth embodiment of the present invention.

FIG. 32 is a block diagram showing a tenth embodiment of the present invention. In the tenth embodiment, the speed regulator 12, a current regulator 101, and the filter 52, a fifth weighting adder 103 and a third state observer 104 constitute a control apparatus 100. The tenth embodiment is obtained by complementing the fifth embodiment of the present invention shown in FIG. 5 with the fifth weighting adder 103 and the third state observer 104.

In the tenth embodiment, the detected current and speed values are fed to the third state observer 104 as in the prior art control device shown in FIG. 33. The fifth weighting adder weights and adds the state variables set by the third state observer and the target current value set by the speed regulator. The fifth weighting adder then transmits the resultant sum to the current regulator.

The third state observer 104 suppresses mechanical vibrations of frequencies lower than the cutoff frequency of the speed detector 7. In addition, as described above in connection with other embodiments of the present invention, the current regulator 101 and filter 52 suppress mechanical vibrations of frequencies higher than the cutoff frequency of the speed detector 7.

Figure 34:
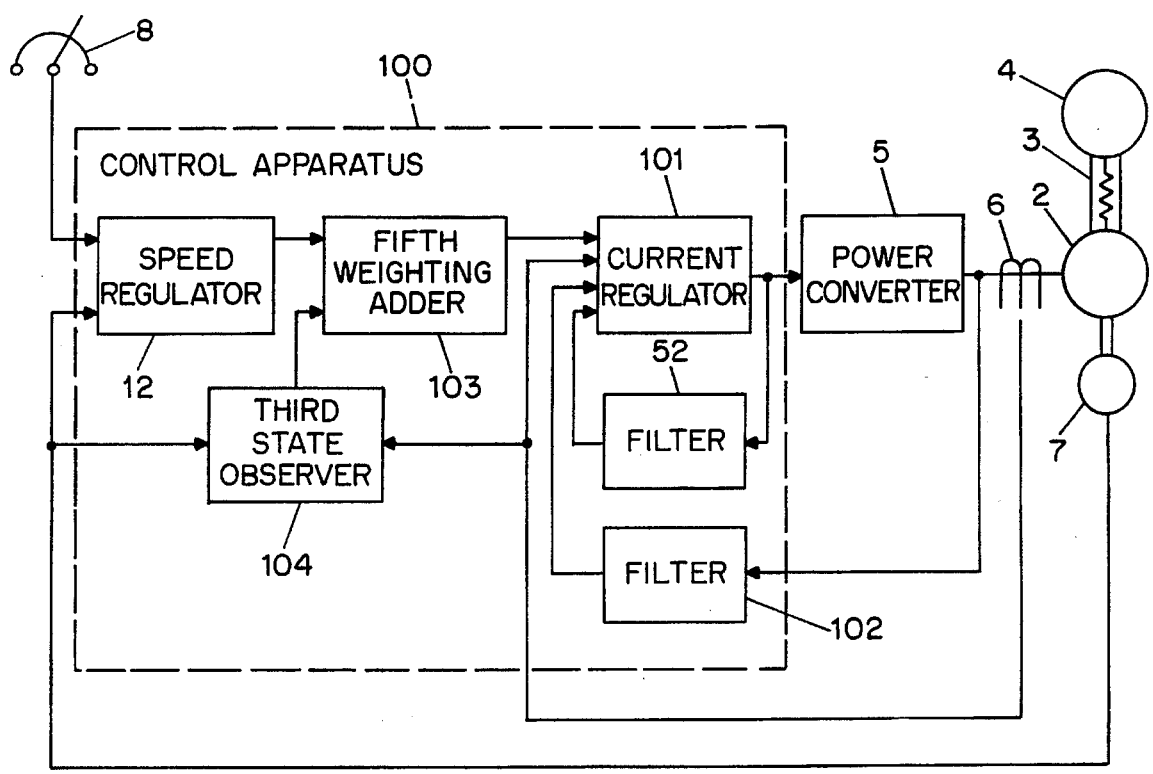
FIG. 34 is a block diagram showing an eleventh embodiment of the present invention.

Shown in FIG. 34 is an eleventh embodiment of the present invention, which modifies the tenth embodiment by further incorporating a filter 102 that filters and feeds the detected armature voltage to the current regulator 101.

While the present invention has been described in connection with specific exemplary embodiments thereof, it will be appreciated by those of ordinary skill in the art that various modifications and alterations may be made to the exemplary embodiments without departing from the spirit or scope of the present invention. For example, although the present invention have been described with reference to the embodiments having analog control circuits, the present invention encompasses digital control circuits which use a microprocessor.

I claim:

1. A control apparatus for controlling a system incorporating a variable speed motor, a load coupled to said motor, a speed detector for detecting speed of said motor, a current detector for detecting an armature current of said motor, and a power converter supplying electric power to said motor, said control apparatus comprising:

a speed regulator for adjusting speed of said motor detected by said speed detector so as to synchronize actual speed of the motor to a target speed set from outside and for outputting a target current value;

a state observer which estimates and outputs state variables comprising the speed of said motor, speed of said load and axial torque based on the armature current and armature voltage;

a weighting adder which weights and adds quantities comprising said state variables set by said state observer and said target current value, said weighting adder outputting result of said adding; and a current regulator for adjusting said armature current detected by said current detector so as to match the armature current to said result output by said weighting adder and for outputting a target voltage value;

wherein said power converter supplies electric power to said motor based on said target voltage value set by said current regulator.

2. The control apparatus as recited in claim 1, wherein said state observer estimates said state variables based on said detected armature current value and said target voltage value.

3. The control apparatus as recited in claim 2, wherein said weighting adder weights and adds quantities further comprising said target current value, and wherein said result of said adding is transmitted to said current regulator.

4. The control apparatus as recited in claim 2, wherein said weighting adder weights and adds quantities further comprising said target voltage value, and wherein said result of said adding is transmitted to said power converter.

5. The control apparatus as recited in claim 1, further comprising a first filtering means connected to said current regulator, and wherein said state observer estimates said state variables based on said detected speed of said motor and said detected armature current value.

6. The control apparatus as recited in claim 5, further comprising:
a second filtering means connected to output side of said power converter for filtering detected armature voltage.

7. The control apparatus as recited in claim 6, wherein said first filtering means is connected in a loop configuration to said current regulator.

8. The control apparatus as recited in claim 7, wherein said second filtering means is connected between output side of said power converter and input side of said current regulator, said second filtering means outputting filtered armature voltage to said current regulator.

9. A control apparatus for controlling system incorporating a variable speed motor, a load coupled to said motor, a speed detector for detecting speed of said motor, a current detector for detecting an armature current of said motor, and a power converter supplying electric power to said motor, said control apparatus comprising:
a speed regulator for adjusting speed of said motor detected by said speed detector so as to synchronize actual speed of the motor to a target speed set from outside and for outputting a target current value;
a current regulator for adjusting said armature current detected by said current detector so as to match the armature current to said target current value set by said speed regulator and for outputting a target voltage value; and
at least one filter connected to said current regulator;
wherein said power converter supplies electric power to said motor based on said target voltage value set by said current regulator.

10. The control apparatus as claimed in claim 9, wherein said at least one filter is connected in a loop configuration to said current regulator, said at least one filter filtering the target voltage value.

11. The control apparatus as claimed in claim 9, further comprising an amplifier for calculating counter-electromotive force of said motor based on said detected speed of said motor.

12. The control apparatus as claimed in claim 11, wherein said amplifier outputs calculated counter-electromotive force to said current regulator.

13. The control apparatus as claimed in claim 11 further comprising an adder for adding said target voltage value set by said current regulator to said counter-electromotive force, said adder outputting result of said addition to said power converter.

14. The control apparatus as claimed in claim 9, wherein said at least one filter is connected between input side of said current regulator and output side of said power converter, said at least one filter filtering the detected current value and feeding the filtered current value to the current regulator.

15. The control apparatus as recited in claim 9 further comprising:
an amplifier for calculating counter-electromotive force of said motor based on said detected speed of said motor, said amplifier outputting calculated counter-electromotive force; and
an adder for adding said target voltage value set by said current regulator to said counter-electromotive force outputted by said amplifier, said adder outputting result of said addition to said power converter.

16. A control apparatus for controlling a system incorporating a variable speed motor, a load coupled to said motor, a speed detector for detecting speed of said motor, a current detector for detecting an armature current of said motor, and a power converter supplying electric power to said motor, said control apparatus comprising:
a speed regulator for adjusting speed of said motor detected by said speed detector so as to synchronize actual speed of the motor to a target speed set from outside and for outputting a target current value;
a current regulator for adjusting said armature current detected by said current detector so as to match the armature current to said target current value set by said speed regulator and for outputting a target voltage value;
a state observer which estimates and outputs state variables comprising the speed of said motor, speed of said load and axial torque; and
a weighting adder which weights and adds quantities comprising said state variables set by said state observer and said target voltage value, said weighting adder outputting result of said adding;
wherein said power converter supplies electric power to said motor based on said result output by said weighting adder.

* * * * *